United States Patent [11] 3,542,317

[72] Inventor James Edward Irby
Rte 3, Box 145, Spartanburg, South Carolina 29301
[21] Appl. No. 724,036
[22] Filed April 25, 1968
[45] Patented Nov. 24, 1970

[54] MODERNIZED HELICOPTER
5 Claims, 4 Drawing Figs.
[52] U.S. Cl. .................................................. 244/17.17, 244/105
[51] Int. Cl. .................................................. B64c 27/00, B64c 27/50
[50] Field of Search .................................................. 244/17.11, 17.15, 17.27, 17.19, 17.21, 17.17

[56] References Cited
UNITED STATES PATENTS
3,098,445  7/1963  Jackson .................. 244/17.15X
FOREIGN PATENTS
704,590  3/1965  Canada .................. 244/17.11
1,475,842  2/1967  France .................. 244/17.11
750,975  2/1945  Germany .................. 244/17.11
686,608  1/1953  Great Britain .................. 244/17.11
126,866  12/1949  Sweden .................. 244/17.11

Primary Examiner—Milton Buchler
Assistant Examiner—Paul E. Sauberer
Attorney—Wellington Manning, Jr.

ABSTRACT: An aircraft of novel shape and design which functions efficiently as a helicopter and can be landed either on land or in water.

Patented Nov. 24, 1970

3,542,317

INVENTOR.
JAMES EDWARD IRBY

MODERNIZED HELICOPTER

SUMMARY OF THE INVENTION

My aircraft comprises a hollow vertical cone, base pointing downward. A cabin for passengers and pilot is disposed in the cone adjacent but above the base. An internal combustion engine is disposed above the cabin in the cone and is provided with an upwardly extending vertical shaft which is rotated about its axis (which is coincident with the vertical axis of the cone) when the engine operates.

The apex of the cone points upward and is separate from the main body of the cone, the apex being secured to the shaft and rotatable therewith. A propeller is secured to the apex and is rotated therewith to fly the aircraft as a helicopter. Means secured to the base of the cone and extending downward therefrom enable the aircraft to be landed with equal facility either on land or in water.

DETAILED DESCRIPTION OF PREFERRED EMBODIMENT

Figure 1:
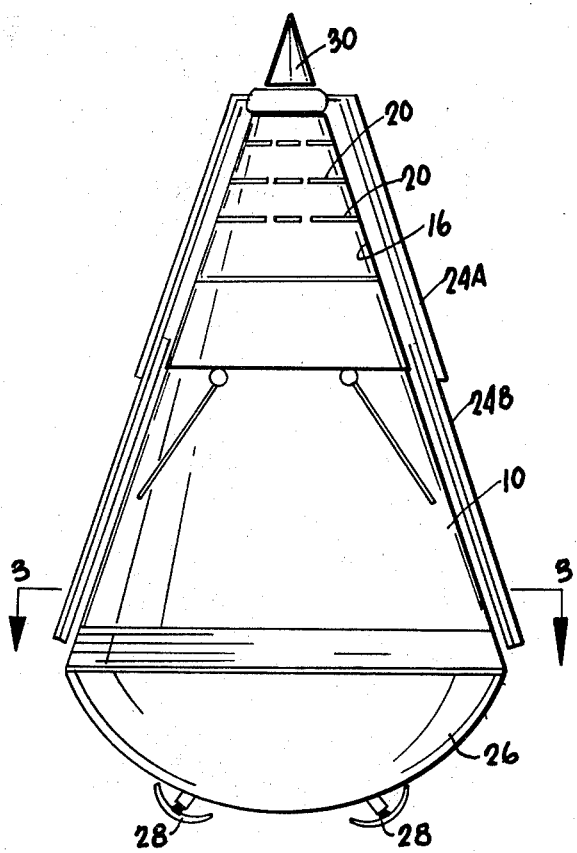
FIG. 1 is a side view of my invention.
Figure 2:
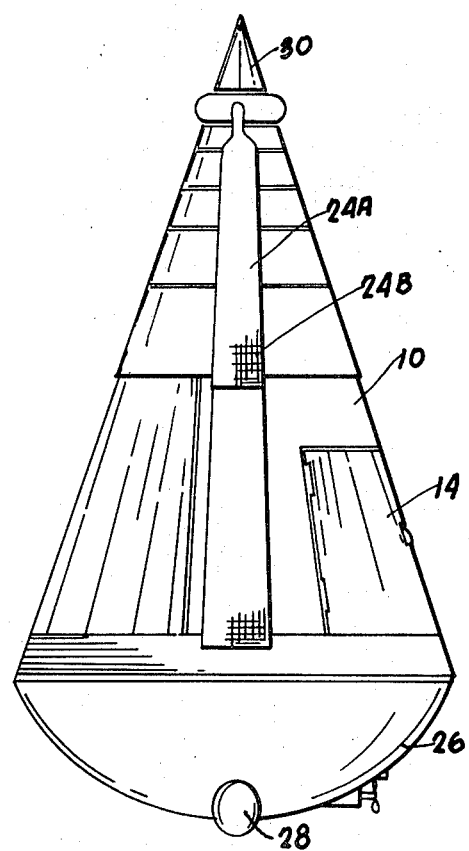
FIG. 2 is a similar view but rotated through 90°.
Figure 3:
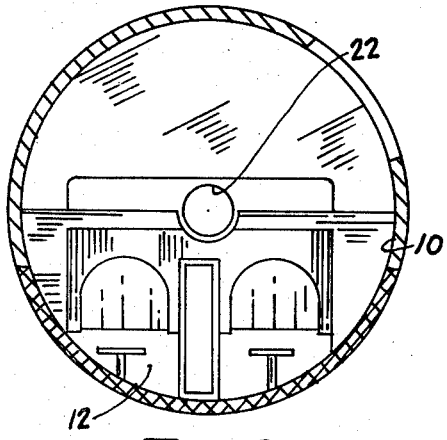
FIG. 3 is view through 3—3 in FIG. 1.

Referring now to FIGS. 1—4, a vertical hollow cone has a base section 10 which is hollow and contains the cockpit 12 with access doors 14 through which the pilot and passengers can enter.

An intermediate hollow section 16 extending upwards from section 12 contains an internal combustion engine 18 with air vents 20. Engine 18 has a vertical drive shaft 22 which extends completely through the cone aligned with the vertical axis thereof and which is rotated about itself when the engine operates.

A top apex section 30 is secured to the top of the shaft and is rotated thereby. A plurality of equidistantly spaced members, each formed from elements 24A and 24B are secured at one end of element 24A to the apex and shaft in a hinged manner whereby when the engine is at rest these members extend downward along the outer surface of the cone.

When in use, these members are raised into horizontal position extending radially outward from the apex and function as a propeller.

A hollow downwardly extending hemispherical dome 26 is secured to the base and serves as a float whereby the aircraft can be landed on water. Wheels 28 can be secured to the bottom of the dome whereby the aircraft can be landed on land as well.

Figure 4:
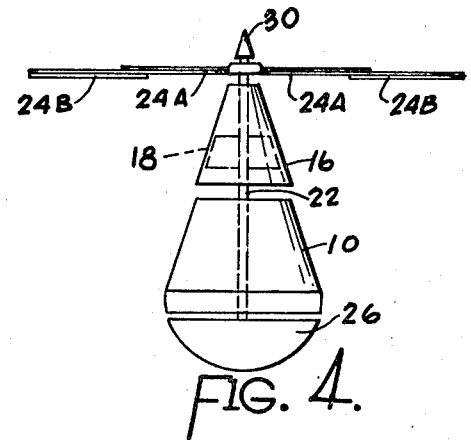
FIG. 4 is a diagramatic showing of my invention in use.

Referring to FIG. 4, the aircraft is shown to comprise separate sections that combine to produce the overall conical shape. Thus members 24A and 24B are shown connected to apex 30 and vertical drive shaft 22. Intermediate hollow section 16 is positioned along drive shaft 22, separate from apex 30 and houses internal combustion engine 18. Below intermediate section 16 and separate therefrom is positioned a base section 10 which contains cockpit 12. Dome 26 is then positioned below and separate from base section 10. Vertical drive shaft 22 passes completely through intermediate section 16, base section 10 and into dome 26.

While I have described my invention with particular reference to the drawings, my protection is to be limited only by the terms of the claims which follow.

I claim:
1. An aircraft comprising:
   a hollow vertical cone with its apex pointing upwards, said cone having an apex, an intermediate section, and a base section, each of said sections being spaced along a vertical drive shaft;
   a cabin in said base section;
   an engine disposed in said intermediate section, said engine being connected to said vertical drive shaft, said engine, when operated, being connected to said apex to rotate same about the vertical axis of the cone; and
   a propeller secured to said apex portion and rotated thereby.
2. An aircraft as set forth in claim 1 wherein said propeller is formed from at least two elongated members which are secured at one end to the apex and when in operation extend radially outward therefrom and are equidistantly spaced from each other.
3. An aircraft as set forth in claim 2 wherein said members extend downward along the outer surface of the cone when not in use.
4. An aircraft as set forth in claim 3 wherein further including a bottom hemispherical dome spaced from said base section along said vertical drive shaft and extending downward to act as a float and permit the aircraft to be landed in water.
5. An aircraft as set forth in claim 4 further including a plurality of wheels secured to said dome and extending downward to permit the aircraft to be landed on land as well as water.